Dec. 30, 1969  S. RUBEN  3,486,940
STORAGE BATTERY HAVING A POSITIVE ELECTRODE COMPRISING
A SUPPORTING BASE OF TITANIUM NITRIDE HAVING
A SURFACE FILM OF NON-POLARIZING MATERIAL
Filed Sept. 9, 1968
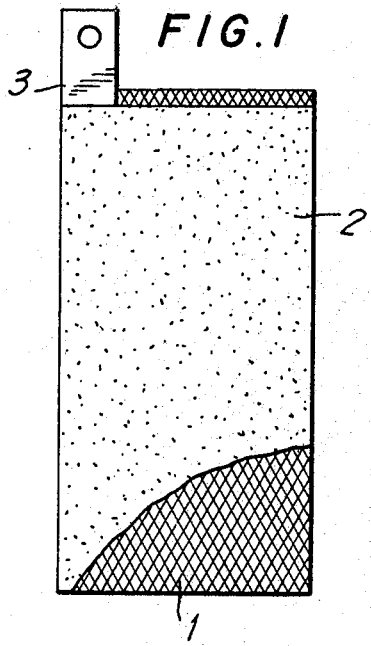
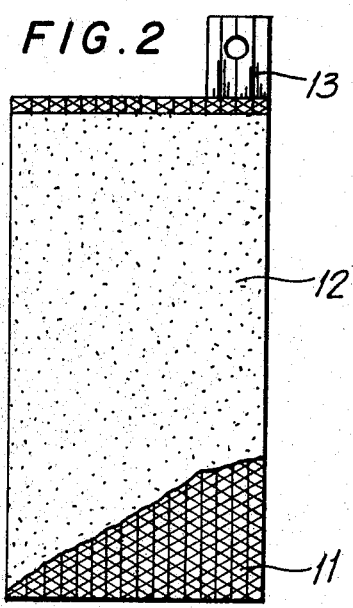
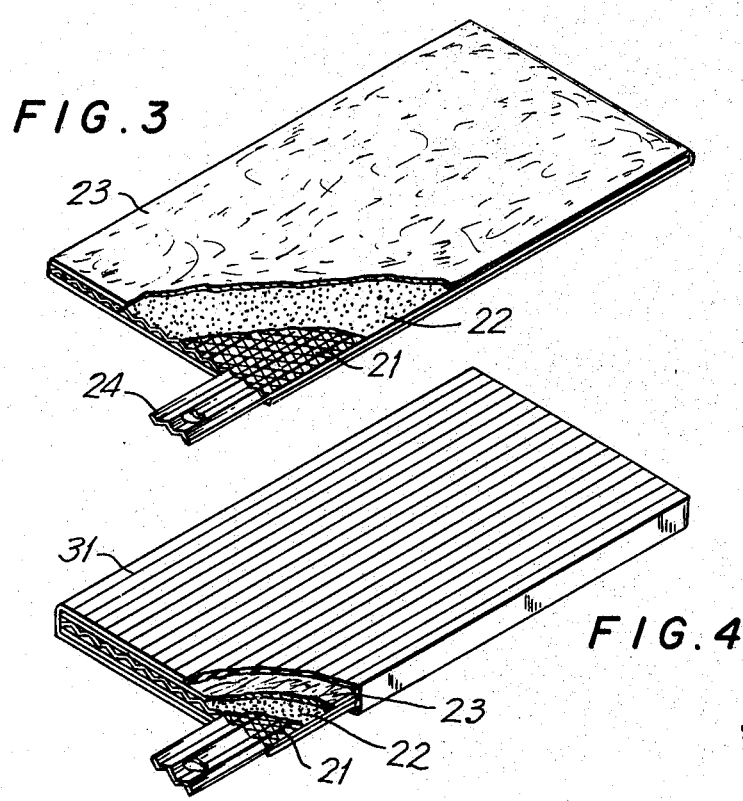
INVENTOR.
SAMUEL RUBEN

United States Patent Office 3,486,940
Patented Dec. 30, 1969

3,486,940
STORAGE BATTERY HAVING A POSITIVE ELECTRODE COMPRISING A SUPPORTING BASE OF TITANIUM NITRIDE HAVING A SURFACE FILM OF NON-POLARIZING MATERIAL
Samuel Ruben, 52 Seacord Road,
New Rochelle, N.Y. 10801
Continuation-in-part of applications Ser. No. 719,725, Apr. 8, 1968, and Ser. No. 754,527, July 30, 1968. This application Sept. 9, 1968, Ser. No. 758,274
Int. Cl. H01m 35/02, 39/00
U.S. Cl. 136—26                                    12 Claims

ABSTRACT OF THE DISCLOSURE

The invention is a lead peroxide-sulfuric acid cell or battery in which the positive electrode is composed of titanium nitride having a thin surface film of a non-polarizing material and coated with lead peroxide. The negative electrode comprises an active porous lead surface. The electrolyte is sulfuric acid.

---

The invention relates to a lead peroxide-sulfuric acid storage battery having a higher output per pound than storage batteries of this type heretofore used or developed. The reduction in weight is accomplished by substituting for one or both of the commonly used lead grids which support the active materials, a grid of titanium nitride, the positive electrode having a surface layer of non-polarizing material, such as a flash of gold.

The present application is a continuation in part of my co-pending applications, Ser. No. 719,725 filed Apr. 8, 1968 and Ser. No. 754,527, filed July 30, 1968, now abandoned, entitled "Lead Peroxide-Sulfuric Acid Battery."

The weight of the battery power source is of fundamental importance in many applications. In conventional lead-sulfuric acid batteries, the weight of the oxide supporting lead grids constitutes a large percentage of the electrode weight.

I have found that titanium nitride is an excellent low-weight base for the support of the active electrode material; it is insoluble in sulfuric acid and is of good electrical conductivity, $21.7 \times 10^{-6}$ ohm cm. Its density is approximately 5.43 g./cm.$^3$ compared with a lead density of 11.34 g./cm.$^3$. However, it possesses one characteristic which prevents or limits its use as the base or support for the positive electrode materials. When coated on a grid or impregnated in a porous structure with lead peroxide and anodized in a sulfuric acid electrolyte, it develops a polarized unilaterally conductive layer at the interface between the titanium nitride and the lead peroxide. This tends to reduce current flow to a minute amount, giving the equivalent polarization of an electrolytic capacitor. 1 have found that this polarization can be prevented by flash-coating the titanium nitride with a non-polarizing material such as gold and that this coating completely eliminates interfacial polarization between the lead peroxide and the titanium nitride. The amount of gold used is negligible, producing only a visible film. While gold is considered the most practical, other materials compatible with a sulfuric acid electrolyte and which will prevent the building of a polarized layer may be used, for instance, electro or vapor deposited lead or antimony or graphite with an acid resistant binder.

The structural form found preferable for utilizing the titanium nitride is an expanded metal pattern with diamond shape perforations having a long axis of 0.77" and a short axis of 0.046". Perforation by the expanded metal process greatly stiffens the metal. For example, a 5 mil thick titanium strip, such as I have used, increases in strand thickness to 15 mils when expanded and provides a firm support for the active materials thereafter applied.

The nitriding of the titanium grid material may be accomplished by the following process: strips of expanded titanium metal are placed, five at a time, on a stainless steel tray and covered with titanium powder, the powder acting as a purifier for the nitrogen gas. These are placed in the furnace at room temperature and flushed with nitrogen at 6 to 8 c.f.h. for thirty minutes. The furnace is then heated to 1100° C. for a two-hour period and maintained at 1100° C. for one hour with a nitrogen flow of 6 to 8 c.f.h. Thereafter, the furnace is shut off and cooled to below red heat and the tray pulled to the cool end of the furnace until a temperature of 200° C. is reached at which time the tray is removed. For commercial production a continuous method may, of course, be applied.

The terminal connectors and the method in which they are affixed to the titanium nitride electrodes are important. I have found that titanium strips spot welded to the titanium electrode before nitriding, and which themselves become nitrided, are the most suitable. They provide a firm, low resistance contact, and being nitrided, are unaffected by the sulfuric acid.

The electrical resistance of thin grids for small batteries made from the expanded titanium is low after nitriding, the resistance from end to end of a 4" x 4" titanium nitride grid being 0.012 ohm. The gold flash surface is too thin to materially affect the conductivity. To increase the active amount of electrode reactant material in the spaces of the titanium nitride grid, the grid is corrugated prior to nitriding. Corrugations of 7 per inch with a 50 mil depth have been found to approximately double the amount of material held by the uncorrugated strip. The corrugations must be done along the short axis of the diamond shaped perforations. The titanium tab connectors are likewise corrugated in the same pattern prior to nitriding and are spot welded to the electrode in a meshed-in form.

The preferred active electrode material may be produced by electrolytic deposition or by applying the material as a paste. The electro-deposition of lead peroxide on the gold plated titanium nitride grid can be derived from such lead acid solutions as lead acetate, lead sulfamate or lead nitrate, the lead acetate being preferred. The mount of oxide deposited is approximately 4.6 grams per ampere hour.

In applying the material in paste form, I prefer a binder composed of a 10% solution of a co-polymer of polyvinyl chloride in a ketone solvent, such as methyl isobutyl ketone. Another suitable binder is composed of a 15% solution of polystyrene in xylol. Each of these affords bonding without introduction of excess resistance to the active components, whereas many of the other available binders tend to isolate the particles of oxide or lead and reduce effective areas or prevent adequate ionic flow to their surfaces. The oxide I prefer for both electrodes is a mixture of PbO and finely divided lead, which can be electrolytically converted to $PbO_2$ or Pb through intermediate reactions of $PbSO_4$. The electrodes are coated (3 grams per square inch) with the paste and while still wet with the contained solvent, a sheet of unwoven styrene bonded glass fibre is applied to both sides. The glass fibre mat is pressed into the paste and the entire unit is baked in an oven at 90° C. to eliminate the solvent. The resultant product is a unitary structure in which the active electrode materials are securely retained. Shredding of the active materials is also reduced by this integrally bonded glass fibre mat, which has a thickness of only 5 mils and is sufficiently porous as not to add substantial ionic impedance to the electrode. In a preferred form, the wrapped electrode is closely encased in a rigid envelope or case of microporous synthetic rubber, such as "Synpor," a form of polyvinyl chloride.

For the negative electrode I prefer a base of expanded copper. I have found that copper, initially lead plated and coated with the PbO/Pb paste and thereafter formed by electrolytic reduction to porous lead, withstands the sulfuric acid electrolyte, without dissolution of the copper which would occur if that metal were used as the positive electrode. The lead plating prevents or limits air line corrosion and it also prevents dissolution of the copper into the electrolyte in the event of a reverse charge on the battery. Alternatively, a nitrided expanded titanium negative electrode may be utilized.

Another method of producing a porous negative electrode is to spray lead onto a glass fibre mat. This produces a strong, porous lead surface of good, effective electrode area. Conventional negative lead electrode structures could also be used.

The electrolyte used for both primary and secondary cells of this invention is sulfuric acid, 20 parts by volume to distilled water. If desirable, the electrolyte may be immobilized.

The electrical characteristics of the cell of this invention are similar to those of conventional lead/acid batteries, but have high flash currents due to the uniform distribution of contact between the grid and the oxides. The electrochemical efficiency of the system is higher than that of the standard lead/acid cell, this being due to the elimination of an internal lead peroxide/lead couple which causes self-discharge.

In the drawings, an electrode embodying the invention is shown partly in section, the base 1 being a diamond shaped grid of nitrided expanded titanium having a thin plating of gold. The spaces in the grid are filled with a mixture 2 of PbO, finely divided Pb and a bonding agent, which, before use, is electrolytically converted to lead peroxide. Titanium nitride tab 3 spot-welded to the titanium electrode base 1 before nitriding serves as the terminal.

An electrode of increased capacity is illustrated in FIG. 2 in which the base electrode 11 is a grid of expanded titanium sheet, having a gold flash surface and which has been formed with corrugations of 50 mil. depth, 7 to the inch, and thereafter impregnated and coated with lead peroxide 12. In order to avoid cracking and splitting, the expanded titanium metal sheet is fed into the corrugator in the direction of the long axis of the perforations. The resultant corrugations, therefore, extend lengthwise across the short axis of the diamond shaped perforations. The capacity of this electrode is approximately double that of the electrode illustrated in FIG. 1. Terminal tab 13, consists of two strips of corrugated titanium, meshed in with electrode 12, and simultaneously nitrided therewith.

FIG. 3 illustrates a positive electrode partly in section in which the nitrided corrugated expanded titanium metal grid 21 is coated and impregnated with a ground mixture of 75% PbO, 25% Pb powders, suspended in a binder composed of a 10% solution of a co-polymer of polyvinyl chloride in methyl isobutyl ketone. The paste mixture is composed of 100 parts of PbO/Pb powder and 10 parts of the ketone polyvinyl chloride solution. Glass fibre mat pieces 23 are placed on the coated electrode and pressed into the wet paste, the assembly being then baked at 90° C. for one hour to provide a unitary structure. Preferably the glass mats are folded over the bottom of the electrode. While the PbO/Pb mixture is preferred, other lead oxides electrolytically convertible to PbO for the positive electrode or to Pb for the negative electrode. such as $Pb_3O_4$, can be used. Terminal tab 24 of titanium nitride is welded to the grid 21 before nitriding.

In FIG. 4 the electrode of FIG. 3 is shown encased in a rigid, close fitting envelope of synthetic rubber, such as polyvinyl chloride 33. The "Synpor" case may be molded or it may be formed from rigid sheets cemented into a thin rectangular case to provide a microporous container which is permeable to the sulfuric acid electrolyte. The case 33 which is preferably in contact with the glass fibre wrapped electrode serves to further retain the oxide and prevents deformation of the electrode.

For some applications, a sintered porous electrode structure of titanium nitride can be used, as described in my prior application, Ser. No. 719,725. However, its active surfaces should have a non-polarizing coating, similar to that described above for the expanded metal electrode.

A typical battery assembly may consist of a positive electrode, such as illustrated in FIG. 4, a negative electrode of lead coated copper and an electrolyte of sulfuric acid in a container of polyethylene. External leads from the elements can be composed of titanium nitride for minimum external corrosion effects. The bolts, nuts, washers, posts, etc., used in making connection and fastening to the circuit cables may also be composed of titanium nitride.

I claim:

1. A storage battery having an electrolyte of sulfuric acid and positive and negative electrodes, the positive electrode comprising a supporting base of titanium nitride having a coating of lead peroxide, a non-polarizing layer interposed between the titanium nitride and the lead peroxide, the negative electrode comprising lead.

2. The storage battery described in claim 1 characterized in that the non-polarizing layer is a film of gold on the titanium nitride.

3. The storage battery described in claim 1 characterized in that the negative lead electrode has a supporting base of titanium nitride.

4. The storage battery described in claim 1 characterized in that the negative lead electrode has a supporting base of copper.

5. The storage battery described in claim 1 characterized in that the negative electrode comprises lead sprayed onto a fibre base.

6. The cell described in claim 1 characterized in that the positive electrode has a wrapper of glass fibre over the coating of lead peroxide.

7. The cell described in claim 1 characterized in that the positive electrode has a wrapper of glass fibre over the coating of lead peroxide and a rigid container of synthetic microporous rubber closely surrounding and in contact with said wrapped electrode.

8. The cell described in claim 1 characterized in that the positive electrode has a wrapper of porous glass fibre bonded to the coating of lead peroxide and a rigid container of microporous electrolyte permeable polyvinyl chloride closely surrounding and in contact with said wrapped electrode so as to restrict deformation of said electrode.

9. The cell described in claim 1 characterized in that the supporting base is formed from nitrided expanded titanium sheet.

10. The cell described in claim 1 characterized in that the supporting base is formed from corrugated nitrided expanded titanium sheet.

11. The cell described in claim 1 characterized in that the supporting base comprises nitrided expanded titanium sheet having diamond shaped perforations.

12. A storage battery comprising a case containing an electrolyte of sulfuric acid, a positive electrode comprising a base of nitrided expanded titanium sheet, the perforations therein being diamond shaped, said positive electrode being corrugated across the short axis of the perforations and having a gold flash thereover and a coating of lead peroxide over the gold surface, a negative electrode comprising copper having a coating of lead thereover, a terminal tab of titanium nitride welded to the positive electrode and venting means to permit the escape of gas.

References Cited

UNITED STATES PATENTS

| 263,756 | 9/1882 | Brush | 136—45 |
| 468,367 | 8/1889 | Aldrich | 136—26 |
| 2,631,115 | 3/1953 | Fox | 136—138 |
| 3,380,856 | 4/1968 | Pohl | 136—120 |

FOREIGN PATENTS 1,891  4/1892  Great Britain.

WINSTON A. DOUGLAS, Primary Examiner

A. SKAPARS, Assistant Examiner

U.S. Cl. X.R.

136—64